United States Patent
Stewart

(10) Patent No.: US 7,669,006 B2
(45) Date of Patent: *Feb. 23, 2010

(54) SYSTEM AND COMPUTER PROGRAM PRODUCT FOR SYNCHRONIZING DIRECT ACCESS STORAGE VOLUMES

(75) Inventor: Simon David Stewart, Ross Creek (AU)

(73) Assignee: International Business Machines Corporation, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/968,675

(22) Filed: Jan. 3, 2008

(65) Prior Publication Data

US 2008/0104317 A1   May 1, 2008

Related U.S. Application Data

(63) Continuation of application No. 11/270,763, filed on Nov. 8, 2005, now Pat. No. 7,343,447.

(51) Int. Cl.
*G06F 13/00* (2006.01)

(52) U.S. Cl. .................. 711/112; 711/4; 711/154; 711/166

(58) Field of Classification Search ............ 711/4, 711/112, 154, 166
See application file for complete search history.

(56) References Cited

U.S. PATENT DOCUMENTS

| 4,053,752 | A | * | 10/1977 | DeJohn et al. ............ 714/710 |
|---|---|---|---|---|
| 5,454,096 | A | | 9/1995 | Otsuka et al. |
| 6,088,764 | A | | 7/2000 | Shyam et al. |
| 6,330,572 | B1 | | 12/2001 | Sitka |
| 6,401,183 | B1 | | 6/2002 | Rafizadeh |
| 6,715,070 | B1 | | 3/2004 | Peloquin et al. |
| 7,055,014 | B1 | | 5/2006 | Pawlowski et al. |
| 7,143,089 | B2 | * | 11/2006 | Petras et al. ............ 707/5 |
| 2004/0083202 | A1 | | 4/2004 | Mu et al. |
| 2004/0210540 | A1 | * | 10/2004 | Israel et al. ............ 705/80 |
| 2006/0031631 | A1 | | 2/2006 | Abe et al. |
| 2008/0104131 | A1 | * | 5/2008 | Stewart ............ 707/200 |

* cited by examiner

*Primary Examiner*—Reba I Elmore
(74) *Attorney, Agent, or Firm*—Schmeiser, Olsen & Watts; William H. Steinberg

(57) ABSTRACT

A system and computer program product for synchronizing direct access storage volumes designated as managed by storage management software with direct access storage volumes available to a computer system. An identifier of a volume is provided. The volume is connected to and available to a computer system, and is not managed by storage management software. The identifier is matched with an identification pattern included in a record of a database accessible to the computer system. Management options that facilitate managing the volume by the storage management software, and that are included in the record are retrieved from the record. The volume is automatically added to a set of volumes being managed by the storage management software. The adding of the volume includes designating the volume as being managed by the storage management software and providing the management options to the storage management software.

10 Claims, 6 Drawing Sheets

SYSTEM AND COMPUTER PROGRAM PRODUCT FOR SYNCHRONIZING DIRECT ACCESS STORAGE VOLUMES

This application is a continuation application claiming priority to Ser. No. 11/270,763, filed Nov. 8, 2005.

BACKGROUND OF THE INVENTION

1. Technical Field

The present invention relates to a method and system for synchronizing direct access storage volumes, and more particularly to a technique for synchronizing direct access storage volumes managed by storage management software with direct access storage volumes available to a computer system.

2. Related Art

When adding or removing direct access storage volumes on a computing system, storage management software needs to be manually notified of the volume(s) being added or removed. Since the additions or removals are manually performed, human error (e.g., oversight or lack of knowledge) can result in the following problems: (1) failing to add the volume; (2) incorrectly adding the volume; and (3) failing to remove the volume from the storage management software. These problems cause a lack of synchronization between the volumes recognized by the storage management software and the volumes available to the system, thereby leading to difficulties in capacity management, backups, and the processing of volumes by the storage management software. For example, failing to add or incorrectly adding the volume can result in data not being expired or moved elsewhere due to a lack of use, thereby causing a volume to run out of space. Thus, there exists a need for an improved technique for adding volumes to and removing volumes from storage management software.

SUMMARY OF THE INVENTION

In first embodiments, the present invention provides a method of synchronizing direct access storage volumes managed by storage management software with direct access storage volumes available to a computer system, comprising:

identifying a first set of one or more direct access storage volumes, the first set physically connected to and available to the computer system, the identifying providing an identifier of a direct access storage volume of the first set;

matching the identifier with an identification pattern included in a record of one or more records residing in a database accessible by the computer system, the identification pattern identifying the direct access storage volume directly or a group of direct access storage volumes including the direct access storage volume;

responsive to the matching, retrieving from the record a plurality of management options capable of facilitating a management of the direct access storage volume by the storage management software, wherein the direct access storage volume is not designated as being managed by the storage management software; and automatically adding the direct access storage volume to a second set of one or more direct access storage volumes, the second set designated as being managed by the storage management software, wherein the adding comprises:

designating the direct access storage volume as being managed by the storage management software, and providing the plurality of management options to the storage management software, wherein the storage management software associates the plurality of management options with the direct access storage volume.

In second embodiments, the present invention provides a system for synchronizing direct access storage volumes managed by storage management software with direct access storage volumes available to a computer system, comprising:

means for identifying a first set of one or more direct access storage volumes, the first set physically connected to and available to the computer system, the identifying providing an identifier of a direct access storage volume of the first set;

means for matching the identifier with an identification pattern included in a record of one or more records residing in a database accessible by the computer system, the identification pattern identifying the direct access storage volume directly or a group of direct access storage volumes including the direct access storage volume;

means for retrieving from the record, responsive to the matching, a plurality of management options capable of facilitating a management of the direct access storage volume by the storage management software, wherein the direct access storage volume is not designated as being managed by the storage management software; and means for automatically adding the direct access storage volume to a second set of one or more direct access storage volumes, the second set designated as being managed by the storage management software, wherein the means for adding comprises:

means for designating the direct access storage volume as being managed by the storage management software, and means for providing the plurality of management options to the storage management software, wherein the storage management software associates the plurality of management options with the direct access storage volume.

In third embodiments, the present invention provides a computer program product comprising a computer-usable medium including computer-usable program code for synchronizing direct access storage volumes managed by storage management software with direct access storage volumes available to a computer system, the computer program product including:

computer-usable code for identifying a first set of one or more direct access storage volumes, the first set physically connected to and available to the computer system, the identifying providing an identifier of a direct access storage volume of the first set;

computer-usable code for matching the identifier with an identification pattern included in a record of one or more records residing in a database accessible by the computer system, the identification pattern identifying the direct access storage volume directly or a group of direct access storage volumes including the direct access storage volume;

computer-usable code for retrieving from the record, responsive to the matching, a plurality of management options capable of facilitating a management of the direct access storage volume by the storage management software, wherein the direct access storage volume is not designated as being managed by the storage management software; and computer-usable code for automatically adding the direct access storage volume to a second set of one or more direct access storage volumes, the second set designated as being managed by the storage management software, wherein the computer-usable code for adding comprises:

computer-usable code for designating the direct access storage volume as being managed by the storage management software, and computer-usable code for providing the plurality of management options to the storage management software, wherein the storage management software associates the plurality of management options with the direct access storage volume.

In fourth embodiments, the present invention provides a method for deploying computing infrastructure, comprising integrating computer-readable code into a computing system, wherein the code in combination with the computing system is capable of performing a process of synchronizing direct access storage volumes managed by storage management software with direct access storage volumes available to a computer system, the process comprising:

identifying a first set of one or more direct access storage volumes, the first set physically connected to and available to the computer system, the identifying providing an identifier of a direct access storage volume of the first set;

matching the identifier with an identification pattern included in a record of one or more records residing in a database accessible by the computer system, the identification pattern identifying the direct access storage volume directly or a group of direct access storage volumes including the direct access storage volume;

responsive to the matching, retrieving from the record a plurality of management options capable of facilitating a management of the direct access storage volume by the storage management software, wherein the direct access storage volume is not designated as being managed by the storage management software; and automatically adding the direct access storage volume to a second set of one or more direct access storage volumes, the second set designated as being managed by the storage management software, wherein the adding comprises:
designating the direct access storage volume as being managed by the storage management software, and
providing the plurality of management options to the storage management software, wherein the storage management software associates the plurality of management options with the direct access storage volume.

Advantageously, the technique described by the present invention provides an automatic process that avoids the manual addition or manual removal of volumes recognized by storage management software in response to a volume being added or removed from the system. Further, the present invention provides an automatic method for updating a volume recognized by storage management software in response to management options associated with the volume being updated. Changes to management options of a group of volumes can be performed in a single step. Moreover, a control file can be generated to include system-specific identifiers, which allows the same control file to be used across multiple systems.

DETAILED DESCRIPTION OF THE INVENTION

Figure 1:
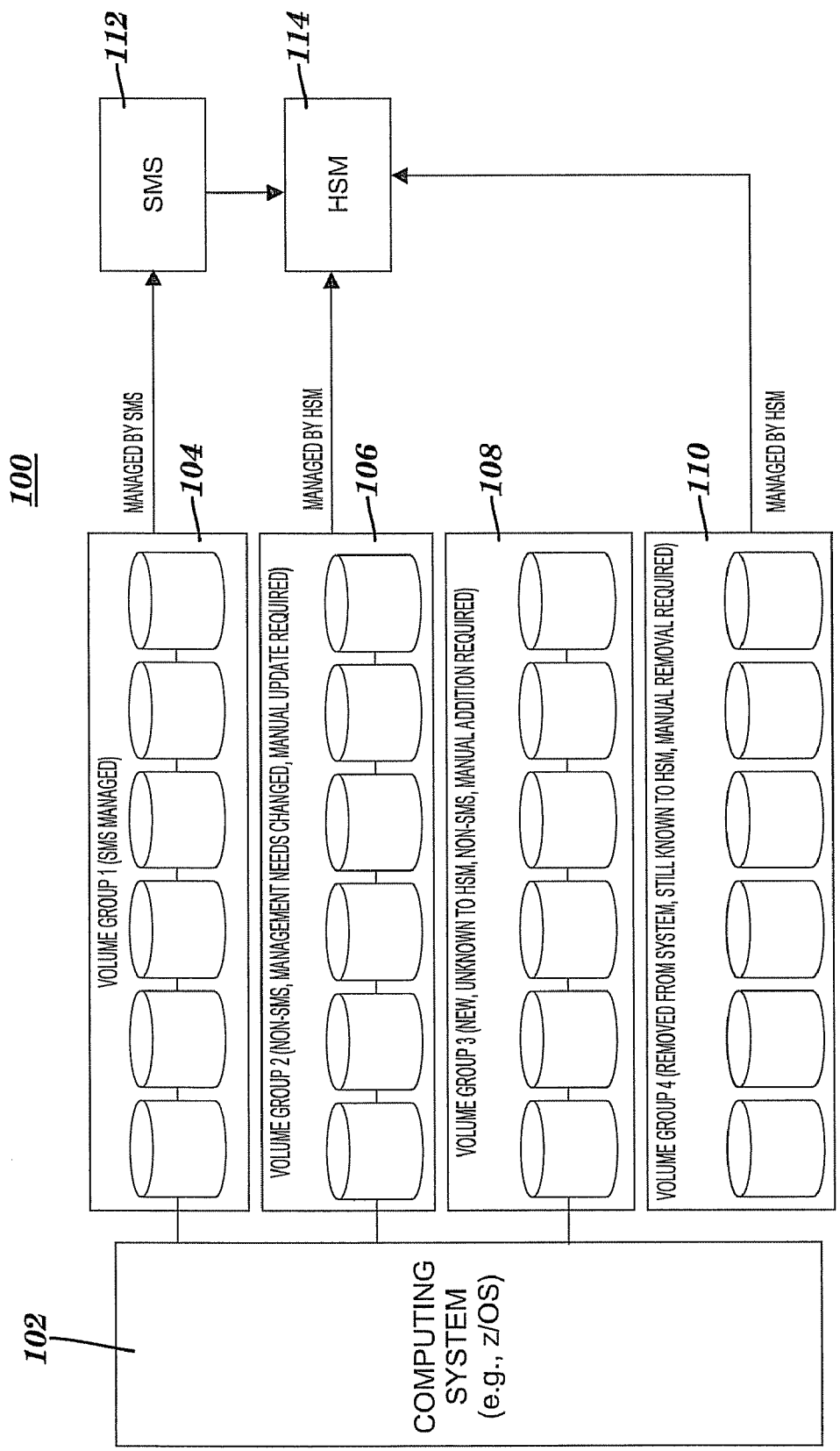
FIG. 1 is a block diagram of a prior art system which requires a manual update of management options of volumes managed by storage management software, a manual addition of volumes that are to be managed by storage management software, and a manual removal of volumes from being managed by storage management software.

FIG. 1 is a block diagram of a prior art system which requires a manual update of management options of volumes managed by storage management software, a manual addition of volumes that are to be managed by storage management software, and a manual removal of volumes from being managed by storage management software. System 100 includes a computing system 102 physically connected to three groups of volumes 104, 106, and 108 (e.g., groups of hard drives). A fourth group of volumes 110 is removed from computing system 102, but was previously connected thereto. Volume group 104 is managed by management software such as System Managed Storage (SMS) 112, a software facility that automates and centralizes the management of data security, placement, migration, backup, recall, recovery and deletion to ensure that current data is available when needed, and obsolete data is removed from storage. SMS 112 utilizes Hierarchical Storage Manager (HSM) 114 to carry out volume management tasks that include the placement, backup and expiration of data, and the automation of these tasks.

Volume group 106 is managed directly by HSM 114. HSM 114 has knowledge of (i.e., has access to) sets of management options, where each set is associated with one of the volumes that HSM manages. Management options are characteristics or attributes that are defined to facilitate the management of a volume. In the configuration of FIG. 1, the data management needs associated with the volumes of volume group 106 have been updated, thereby requiring an update of management options known to HSM 114 and associated with the volumes of group 106.

Volume group 108 includes volumes that are physically connected to computing system 102 (e.g., volumes that have been recently connected to computing system 102). The volumes of volume group 108 are unknown to (i.e., not designated as being managed by) HSM 114, are not managed by SMS 112, and need to be added to the set of volumes managed by HSM 114.

Volume group 110 includes volumes that are removed from (i.e., not connected to) computing system 102 (e.g., volumes that had been physically connected to computing system 102, but which were recently disconnected from computing system 102). As the volumes of volume group 110 are currently known to (i.e., designated as being managed by) HSM 114, removal of these volumes from the set of volumes managed by HSM 114 is required.

In conventional systems, the aforementioned updating of management options associated with volume group 106, adding volume group 108 to the set of volumes managed by HSM 114, and removing volume group 110 from the set of volumes managed by HSM 114 are not automated and require manual actions.

Figure 2:
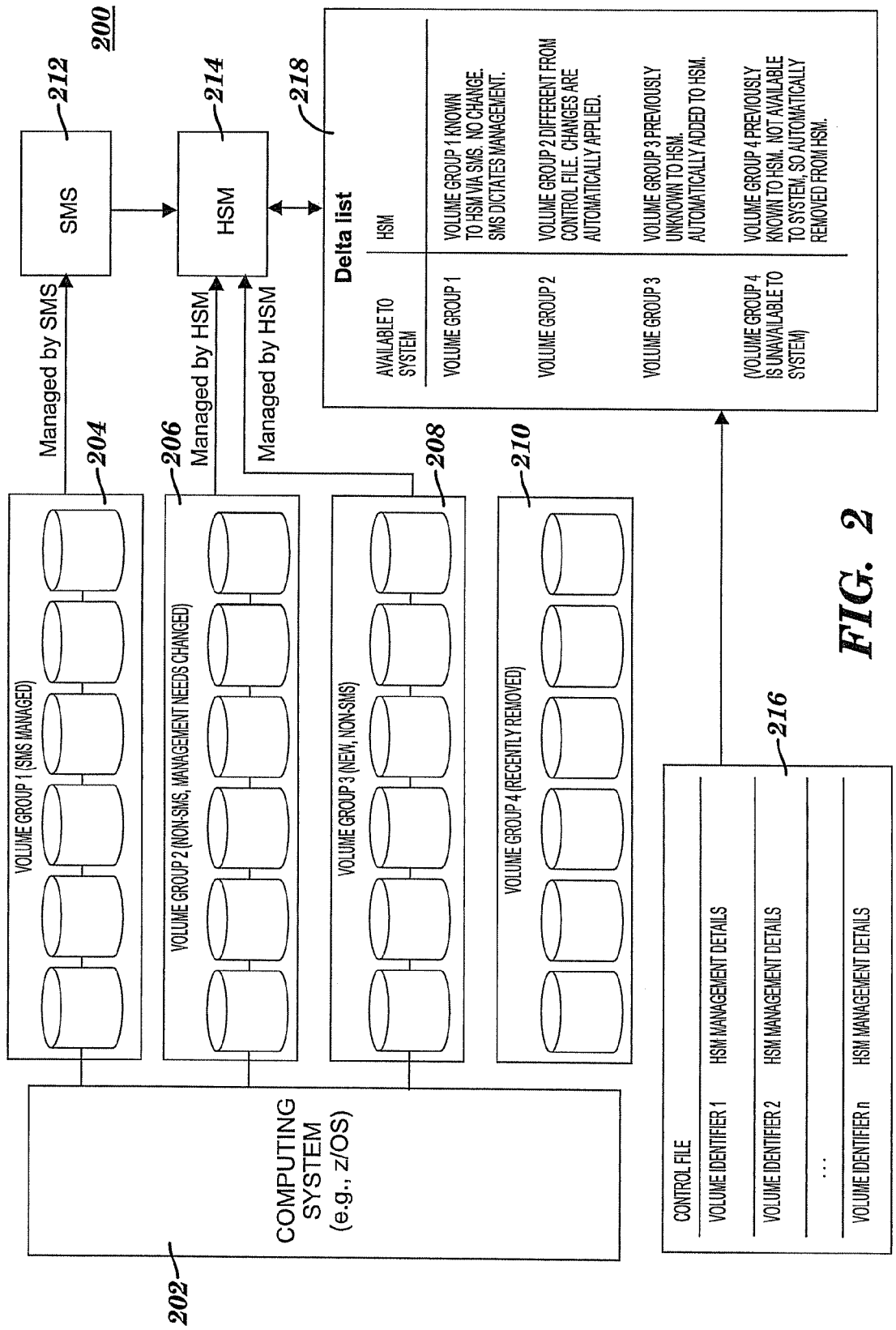
FIG. 2 is a block diagram of a system for synchronizing volumes managed by storage management software with volumes available to a computing system, in accordance with embodiments of the present invention.

The present invention automates the process of updating management options, adding volumes to management software and removing volumes from management software so that the configuration shown in FIG. 1 can automatically and dynamically become the configuration shown in FIG. 2.

FIG. 2 is a block diagram of a system for synchronizing volumes managed by storage management software with volumes available to a computing system, in accordance with embodiments of the present invention. FIG. 2 depicts a system 200 that includes a computing system 202 (e.g., a z/OS mainframe system available from International Business Machines Corporation of Armonk, N.Y.) physically connected to volume groups 204, 206 and 208. As used herein, a volume (a.k.a. direct access storage volume) is defined to be a data storage device in a computing environment for which a backup is performed. In the preferred embodiment, a volume is a hard drive or a direct access storage device (DASD). As used herein, a volume that is available is available to computing system 202 for storage and/or management of data, and is defined to be a volume physically connected to computing system 202.

Volume group 204 includes volumes managed by SMS 212 and known to (e.g., indirectly managed by) HSM 214 via SMS 212. Volume group 206 includes volumes that are not managed by SMS 212, are currently managed by HSM 214, and have had one or more of their associated management options updated. Volume group 208 includes volumes that are physically connected to and available to computing system 202, are not managed by SMS 212, and have been added to the set of volumes managed by HSM 214. In one example, volumes in groups 206 and 208 are appropriately managed by HSM 214 and cannot be appropriately managed by SMS 212 because HSM 214 operates at a volume level, treating all data on a single volume in the same manner, while SMS 212 operates at a file level. Volume group 210 includes volumes that are not connected (i.e., are removed) from computing system 202, and are not managed by SMS 212 or HSM 214. For example, volumes in group 210 have been removed from computing system 202 since the most recent backup of volumes connected to computing system 202.

SMS 212 and HSM 214 have capabilities as described above relative to SMS 112 and HSM 114, respectively. SMS 212 sets management options associated with individual volumes, and requests volume management work or information from HSM 214. HSM 214 stores volume management information relative to the management options set by SMS 212. Although SMS 212 and HSM 214 are shown in the FIG. 2 configuration as being outside computing system 202, both SMS 212 and HSM 214 reside within computing system 202. As examples, SMS 212 is the Data Facility System Managed Storage (DFSMS®) and HSM 214 is the Data Facility System Managed Storage Hierarchical Storage Manager (DFSM-Shsm), which are both available from International Business Machines Corporation. The present invention contemplates that the HSM component of FIG. 2 can be any storage management software that has the aforementioned capabilities of HSM 214.

A control file 216 is a database including a plurality of records. Each record of control file 216 includes a unique identifier (a.k.a. identification pattern) that identifies a specific volume or a group of volumes capable of being available to (i.e., physically connected to) computing system 202. For example, control file 216 includes six-character volume serial numbers (a.k.a. volsers) identifying each hard drive or DASD available to computing system 202. As another example, control file 216 includes volume serial number masks that identify groups of volumes that can be available to computing system 202. Each record of control file 216 also includes a set of management options (e.g., HSM management details). Each set of management options is associated with an identification pattern of the control file, and provides information regarding the management of data on a volume identified by the associated identification pattern. Examples of management of data include the backup of a volume, deletion of a volume's data if the data is expired, and migration of data from one volume to another storage device (e.g., a tape storage device). In one embodiment, control file 216 resides within computing system 202, although this arrangement is not shown in FIG. 2. Data in control file 216 is initially input and updated manually.

A delta list 218 is a list comparing a first set of one or more volumes that are known to HSM 214 to a second set of one or more volumes available to computing system 202. As used herein, a volume known to HSM 214 is defined as a volume directly or indirectly managed or controlled by HSM 214. Delta list 218 indicates whether or not the first set of volumes matches the second set of volumes. The first set of volumes matches the second set if the first set and second set volumes are associated in a one-to-one correspondence and the corresponding volumes are identical (e.g., based on matching volume identifiers), and for each volume in the first set, management options associated a volume of the first set matches management options associated with its corresponding volume in the second set. If the corresponding volumes are not identical, or if the management options of corresponding volumes are not identical, then the first set does not match the second set. When the delta list indicates that the first set does not match the second set, the present invention provides a technique for automatically synchronizing the first and second sets of volumes (i.e., automatically creating a match between the first set of volumes and second set of volumes).

Via the volume identification information from control file 216, delta list 218 indicates that volume groups 204, 206 and 208 are available to computing system 202, and that volume group 210 is not available to computing system 202. Further, the identifiers and management options from control file 216, and the volumes and associated management options known to HSM 214 are utilized so that delta list 218 indicates volumes for which synchronization is required.

Delta list 218 indicates that volume group 204 is available to computing system 202 and is known to HSM 214, with no changes having been made to the management options. The remaining sections of delta list 218 indicate that a previous configuration of volume groups (i.e., similar to the configuration shown in FIG. 1) lacked synchronization relative to volume groups 206, 208 and 210, and also indicate the changes to the previous configuration that have been automatically performed to generate the configuration shown in FIG. 2, which depicts a synchronization between the volumes available to computing system 202 and the volumes known to HSM 214.

For volume group 206, delta list 218 indicates that management options in control file 216 had been updated, causing a mismatch when those control file management options are compared to the management options known to HSM 214. A synchronization process disclosed by the present invention automatically applied changes to the management options known to HSM 214 so that they match the updated control file management options for volume group 206.

Further, delta list 218 indicates that volume group 208 had been previously unknown to HSM 214. The synchronization process automatically added the volumes of volume group 208 to the set of volumes managed by HSM 214.

Still further, delta list 218 indicates that volume group 210 had been previously known to HSM 214, but is currently not available to computing system 202. The synchronization process automatically removes the volumes of volume group 210 from HSM 214. That is, the volumes in group 210 are removed from the set of volumes being managed by HSM 214.

A software-based volume synchronization system (shown in FIG. 5, but not shown in FIG. 2) residing in computing system 202 interacts with HSM 214 and control file 216 to collect the volume identification and management options from HSM 214 and control file 216, and performs the aforementioned synchronization process that includes the volume additions, updates and removals indicated by delta list 218. The synchronization process performed by the volume synchronization system, and which is utilized to generate the configuration shown in FIG. 2 is described below relative to FIG. 3.

Although FIG. 2 includes HSM 214 and SMS 212, other storage management software that is capable of managing volumes can take the place of HSM 214 and/or SMS 212, while still providing the capabilities and features of the present invention. For example, Fast Dump Restore (FDR®) is a software product providing DASD management that may be employed instead of HSM 214. FDR® management software is available from Innovation® Data Processing of Little Falls, N.J.

Figure 3:
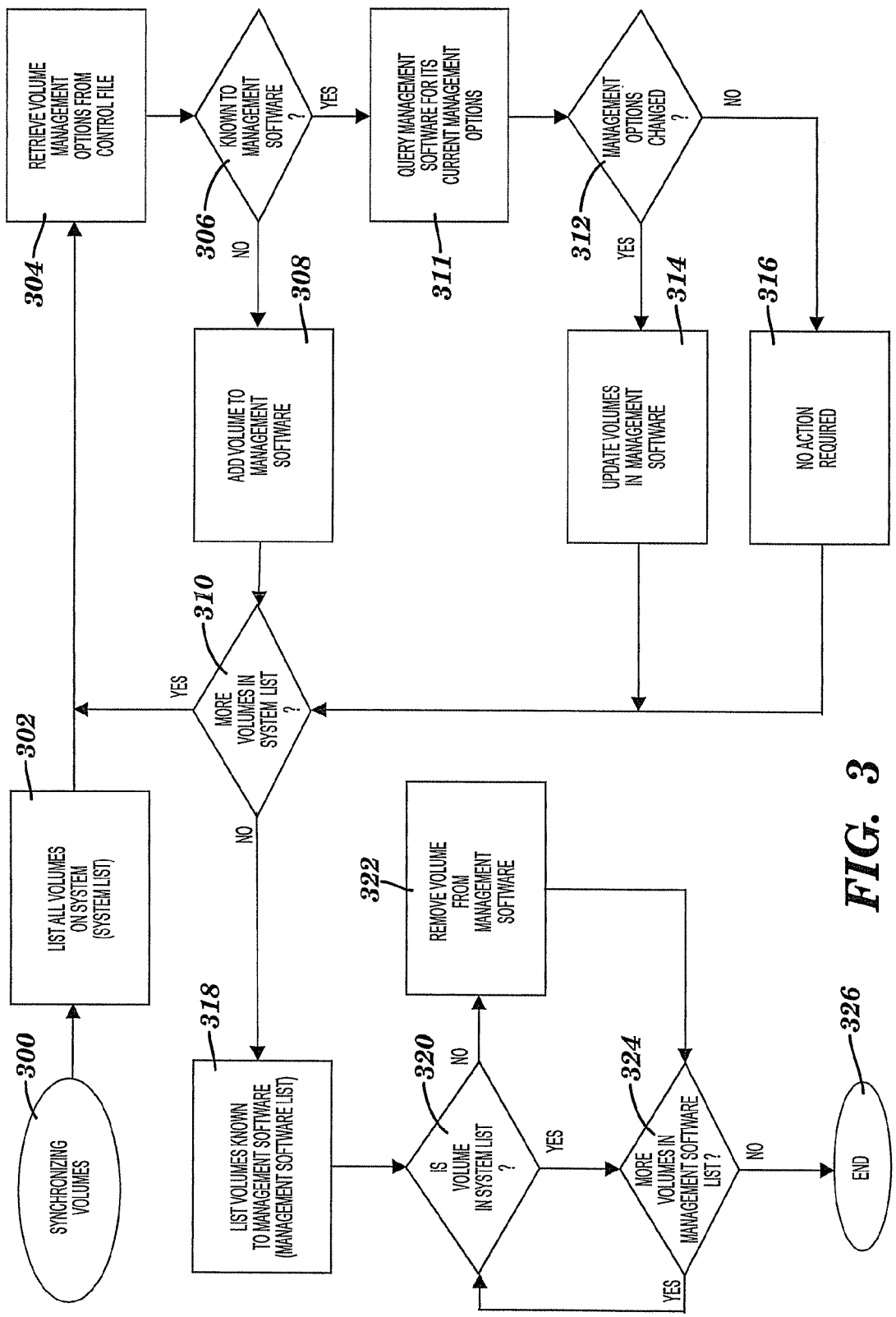
FIG. 3 depicts a flow chart of a process for synchronizing volumes managed by storage management software with volumes available to a computing system, and which is implemented in the system of FIG. 2, in accordance with embodiments of the present invention.

FIG. 3 depicts a flow chart of a process for synchronizing volumes managed by storage management software with volumes available to a computing system, and which is implemented in the system of FIG. 2, in accordance with embodiments of the present invention. The volume synchronization process of FIG. 3 begins at step 300. At step 302, a list of volumes available to (i.e., physically connected to) the system is generated by a data collection software-based tool such as DCOLLECT. DCOLLECT is a data collection facility that obtains a list of volumes available to a computer system, as well as other information related to space utilization and capacity planning. DCOLLECT is provided by IDC Access Method Services (IDCAMS), which is a data management utility for z/OS mainframes, and is available from International Business Machines Corporation of Armonk, N.Y. The list generated in step 302 is hereinafter referred to as the system list. Step 302 also obtains identification data (e.g., a serial number) that identifies each volume in the system list. For example, step 302 obtains one or more unique volume serial numbers associated with the one or more direct access volumes identified by DCOLLECT in a one-to-one correspondence. It will be apparent to one skilled in the art that software tools or methods other than DCOLLECT are available to produce the system list.

A loop begins at step 304 for the first volume in the system list, and the first iteration of the loop includes a search of control file 216 (see FIG. 2) for a record that includes an identifier that matches the volume identification data (e.g., volume serial number) collected in step 302 for the first volume of the system list. For a subsequent iteration of the loop starting at step 304, the next volume in the system list becomes the current volume, and another search of control file 216 (see FIG. 2) is performed to find volume identification that matches the current volume. As used herein relative to the loop starting at step 304, the current volume is defines as the volume included in the system list for which the control file is being searched to find an identifier matching the volume identification data associated with the volume. For example, the current volume's serial number obtained by DCOLLECT is used to match a specific serial number or a generic serial number pattern or mask in control file 216 (see FIG. 2). A serial number mask in control file 216 (see FIG. 2) can be, for instance, "M..SH." where the periods indicate character positions in which any character can appear. In this example, any six-character volume serial number that has M, S and H in the first, fourth and fifth character positions, respectively, and any character in the second, third and sixth character positions (e.g., MABSH1) is considered a match to the M..SH. mask. Hereinafter, a match between the volume identification data of the current volume as determined by step 302 and an identifier in a record of control file 216 (see FIG. 1) is simply referred to as a match between the current volume and the control file record. Specific techniques for determining the match in step 304 are discussed below relative to FIGS. 4A and 4B.

In response to finding a match between the current volume and a record of control file 216 (see FIG. 2), step 304 also retrieves the management options in the matching record of control file 216 (see FIG. 2). The volume management options retrieved by step 304 include, for example, the type of the volume (e.g., primary or migration) and management attributes related to the type of volume. In one embodiment, each record of control file 216 (see FIG. 2) includes a volume serial number mask in predefined columns of a text file, and indicators of management options in other predefined columns. For example, a control file can include the following records:

| M..SH. | PYY | T | 80 70 | WEEKLY |
|---|---|---|---|---|
| M..SY. | PY | T | 80 70 | WEEKLY |
| . | | | | |
| . | | | | |
| . | | | | |
| ...... | PY | | | WEEKLY |

The sample control file above indicates volume serial number masks in the leftmost 6 columns (e.g., M..SH.), where the period is a symbol that can be matched with any character. Following each mask is the character P in a predefined column that indicates the type of a volume that is matched to the mask. In this case, P indicates that the volume is a primary volume. A primary volume is a hard disk or direct access storage device that is available to users for data storage and data manipulation. Other characters replacing P in the predefined column can designate other volume types. For example, M indicates a migration volume, which is a volume to which unused data is moved from a primary volume to make space for high-availability data on the primary volume.

In each of the sample records above, the characters to the right of the volume type character (e.g., P) indicate volume management options associated with the record's designated volume type. Since P is the volume type in the control file example shown above, the remaining characters in each record indicate management options associated with a primary volume. A character or string of characters and its column position(s) determine a particular management option according to predefined descriptions that are associated with one or more columns. In one embodiment, control file 216 (see FIG. 2) includes commented lines that describe the management options and indicate the column(s) associated with each management option.

As one example, primary volume management options retrieved by step 304 are related to an automatic backup of data on the volume during a specified cycle and to a specified category of a backup device, and in response to the data being at least a specified age, or a specified time elapsing since the most recent reference of the data; an automatic full volume dump of all allocated space on the primary volume to a designated tape dump volume based on a specified frequency; an automatic migration of data from the primary volume to a migration volume in response to a specified threshold level of occupancy being exceeded, the data being at least a specified age, or a specified time elapsing since the most recent reference of the data; and an automatic recall of data from a migration volume to the primary volume.

In the sample control file shown above, the first Y character of the first record indicates that an automatic dump feature has been activated; the second Y character indicates that an automatic backup feature has been activated; the T character indicates that tape, rather than a direct access storage device (DASD), is designated as the type of backup device; 80 is the high threshold percentage for incremental migration; 70 is the low threshold percentage for daily migration; and WEEKLY is the name of a dumpclass in HSM 214 (see FIG. 2).

During daily migration, if the occupancy rate of the primary volume associated with the record exceeds the low threshold, data on the volume is migrated to another volume until the occupancy rate is below the low threshold. Nothing else can be done by the volume until its rate is less than the low threshold. During incremental migration (e.g., occurs every hour), if the occupancy rate of the primary volume exceeds the high threshold, data on the volume is migrated to another volume until the rate is below the high threshold. Incremental migration is not applied to every volume, but rather to only a specified group of volumes. A customization of HSM 214 (see FIG. 2) can provide an automated migration feature by which migration automatically starts in response to passing a low or high threshold.

The WEEKLY dumpclass included in the first record shown above indicates that the class will not dump the primary volume associated with the record within 7 days of its last dump. Time periods other than 7 days can be indicated by other dumpclasses (e.g., MONTHLY). Dumpclasses are defined by an administrator and can have any name up to a maximum number of characters (e.g., 8 characters). HSM 214 (see FIG. 2) does not define any dumpclasses by default. A volume may have more than one dumpclass associated therewith, such as both WEEKLY and MONTHLY.

Other characters or character strings can be included and/or other columns can be utilized in a control file record to indicate other management options (e.g., activation of an automatic migration feature, activation of an automatic recall feature, deletion of the volume based on age or backup status, etc.).

In one embodiment, a catchall serial number mask (e.g., " . . . " in the sample control file shown above) is placed in the last record of the control file, where the last record also includes a predefined set of minimum management options that are to be associated with any volume that does not conform to the volume identification or volume naming standard that is incorporated into the other records of the control file (e.g., via the volume serial number masks). In the control file example shown above, any volume serial number that does not match one of the masks listed prior to the last mask is automatically matched to the . . . mask, which designates the volume as a primary volume with the automatic dump feature activated.

Inquiry step 306 queries HSM 214 (see FIG. 2) to determine if the current volume is known to (i.e., managed by or controlled by) HSM 214 (see FIG. 2). For instance, the current volume is known to HSM 214 (see FIG. 2) if the volume identification data associated with the current volume, which is collected by step 302, matches one of the volume identifiers known by HSM 214 (see FIG. 2), which identify the volumes managed by HSM 214 (see FIG. 2). If step 306 determines that the current volume is not managed by HSM 214 (see FIG. 2), then step 308 automatically adds the current volume to a set of one or more volumes managed by HSM 214 (see FIG. 2). The management options retrieved in step 304 which are associated with the current volume are also added to HSM 214 (see FIG. 2) in step 308. The addition of the current volume and management options in step 308 can be performed by, for example, a command line interface (CLI) or an application programming interface (API). Adding a volume to a set of one or more volumes designated as being managed by HSM 214 (see FIG. 2) is defined as designating the volume as being managed by HSM 214 (see FIG. 2) and providing the management options associated with the volume to HSM 214 (see FIG. 2), wherein the HSM associates the management options with the volume. Hereinafter, adding a volume to a set of one or more volumes designated as being managed by HSM 214 (see FIG. 2) is also referred to simply as adding the volume to HSM 214 (see FIG. 2).

Returning to inquiry 306, if the current volume is being managed by HSM 214 (see FIG. 2), then step 311 queries HSM 214 to retrieve previously generated management options which HSM 214 has knowledge of and associates with the current volume. Inquiry step 312 compares the volume management options retrieved in step 304 to the management options retrieved in step 311. If the comparison in step 312 determines that the management options of the current volume have changed since the generation of the management options currently known to HSM 214 (see FIG. 2), then step 314 automatically updates the current volume's management options in HSM 214 (see FIG. 2) to match (i.e., to be identical to) the management options retrieved in step 304. The step 314 update is performed by, for instance, a CLI or an API. On the other hand, if step 312 determines that the management options of the current volume have not changed, then no update action is required, as is indicated by step 316.

Following steps 308, 314 and 316, inquiry step 310 determines if the system list includes at least one volume for which an identifier and management options have not been found by step 304. If step 310 determines that a system list volume remains whose identifier has not yet been searched for in step 304, the process of FIG. 3 loops back to step 304, with the next volume in the system list becoming the current volume. If inquiry step 310 determines that all volumes in the system list have been utilized in the iterations of the loop beginning at step 304, then the synchronization process continues with volume removal at step 318. Step 318 generates a list that identifies the volumes that are designated as being managed by (i.e., known to) HSM 214 (see FIG. 2). Hereinafter, the list generated in step 318 is referred to as the management software list.

A condition-controlled loop begins at step 320 for the first volume in the management software list, and the first iteration of the loop includes inquiry step 320 that searches the system list generated in step 302 for the first volume of the management software list. For example, inquiry 320 searches the system list for an identifier that identifies the first volume in the management software list (i.e., an identifier that matches an identifier associated with the first volume by the management software). In the first iteration of the step 320 loop, the first volume in the management software list is the current volume. For a subsequent iteration of the loop starting at step 320, the next volume of the management software list becomes the current volume, and another search of the system list is performed to determine whether the current volume is in the system list. As used herein relative to the loop starting at step 320, the current volume is defined as the volume included in the management software list for which the system list is being searched to find an identifier that matches the identifier associated with the volume by the management software.

If inquiry step 320 determines that the current volume in the management software list is not also in the system list, then step 322 automatically removes the current volume from the management software list by, for example, a CLI or an API. Removal from the management software list indicates that the removed volume is no longer managed by HSM 214 (see FIG. 2). If inquiry 320 determines that the current volume in the management software list is also in the system list, then inquiry 324 determines if one or more volumes remain in the management software list that have yet to be compared to the system list in step 320. If step 324 determines that at least one volume has yet to be compared in step 320, then the process of FIG. 3 repeats starting at inquiry step 320, with the next volume in the software management list becoming the current volume. If step 324 determines that no other volumes remain in the management software list that have not been compared to the system list in step 320, then the synchronization process ends at step 326.

It will be apparent to one skilled in the art that the REXX code included in the Code Example section presented below can be utilized to implement steps 308, 314 and 322 of the synchronization process of FIG. 3.

The synchronization process of FIG. 3 is, for instance, efficiently utilized in conjunction with, and prior to, a backup or dump of computing system 202, or a restart of the management software. For instance, backups of computing system 202 are scheduled nightly, and a volume is added to computing system 202 during the day. Instead of running the synchronization process during the day, immediately after the volume is added, the synchronization process is executed at night in tandem with the nightly backup. First the synchronization process executes to add the volume to the set of volumes managed by the management software, and then the scheduled backup executes.

In one embodiment, the determinations made in the inquiry steps 306, 312 and 320 generate delta list 218 (see FIG. 2), which includes a list of differences between the set of volumes available to system 202 (see FIG. 2) and the set of volumes designated as being managed by HSM 214 (see FIG. 2).

In another embodiment that utilizes a single command that is capable of performing both the adding of the volume in step 308 and the updating of management options in step 314, the steps of 306, 308, 311, 312, 314 and 316 can be replaced by a new step 305 (not shown). In this embodiment, step 305 follows step 304 and adds the current volume along with the management options retrieved in step 304 to the set of volumes designated as being managed by the management software. After the new step 305, the process continues with step 310. In this case, the loop of steps 320-324 is also modified to remove from the management software the volumes that have not been added by the new step 305. The Code Example section presented below includes one implementation of this embodiment.

Figure 4A:
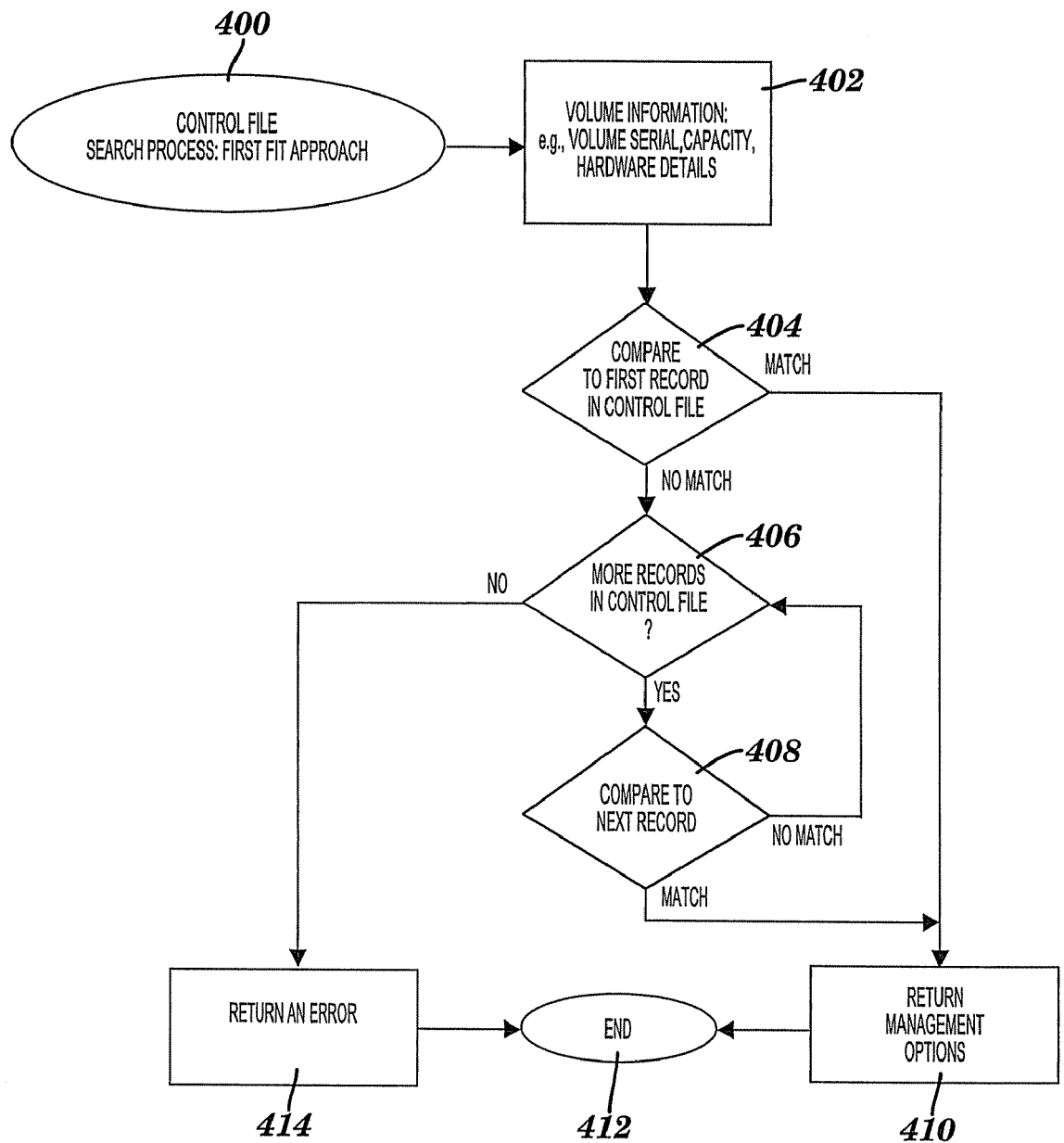
FIG. 4A is a flow chart of a process for retrieving volume management options for the process of FIG. 3 by searching a control file by a first fit approach, in accordance with embodiments of the present invention.

FIG. 4A is a flow chart of a process for retrieving volume management options for the process of FIG. 3 by searching a control file by a first fit approach, in accordance with embodiments of the present invention. The first fit approach of FIG. 4A begins at step 400, and is one example of a retrieval technique utilized by step 304 (see FIG. 3). Step 402 obtains volume information that is associated with the current volume as indicated by the loop starting at step 304 (see FIG. 3). The volume information is collected by the data collection tool utilized in step 302 of FIG. 3. The volume information includes, for instance, the current volume's serial number, capacity, and hardware details.

In step 404, the volume information obtained in step 402 is compared to the first record in control file 216 (see FIG. 2). For example, the current volume's serial number is compared to the identification pattern included in the first record of control file 216 (see FIG. 2). Each record of the control file includes an identification pattern, which is either a specific identifier that identifies a specific volume or a generic pattern or mask that identifies a group of volumes. Each record of the control file also includes a set of management options associated with the specific identifier or generic pattern. The patterns and their associated volume management options are determined, for instance, by considering the type of hardware on which the volume exists. For example, a user may determine that management options for expensive, newer hardware are different from the management options for cheaper, older hardware.

If the serial number of the current volume does not match the identification pattern of the first record of control file 216 (see FIG. 2), inquiry step 406 determines if there are other records in control file 216 (see FIG. 2) that have not yet been compared to the volume information. If step 406 determines that there are additional records in the control file, step 408 compares the volume serial number of the current volume to the specific identifier or generic pattern included in the next record in the control file. If step 408 determines that there is no match between the identification pattern of the next record and the volume information, then the process repeats starting at step 406. Otherwise, there is a match between the identifier of the next record and the volume information, and the management options included in the next record are returned in step 410 to the process of FIG. 3, and the search process of FIG. 4A ends at step 412.

Returning to step 404, if the first record in the control file matches the volume information, step 410 returns the management options included in the matched first record of control file 216 (see FIG. 2) to the process of FIG. 3, and the search process of FIG. 4A ends at step 412.

Returning to step 406, if no additional records exist in control file 216 (see FIG. 2) (e.g., all records in the control file have been compared to the volume information obtained in step 402 and no match has been found in steps 404 or 408), then an error is returned in step 414 and the search process of FIG. 4A ends at step 412.

Figure 4B:
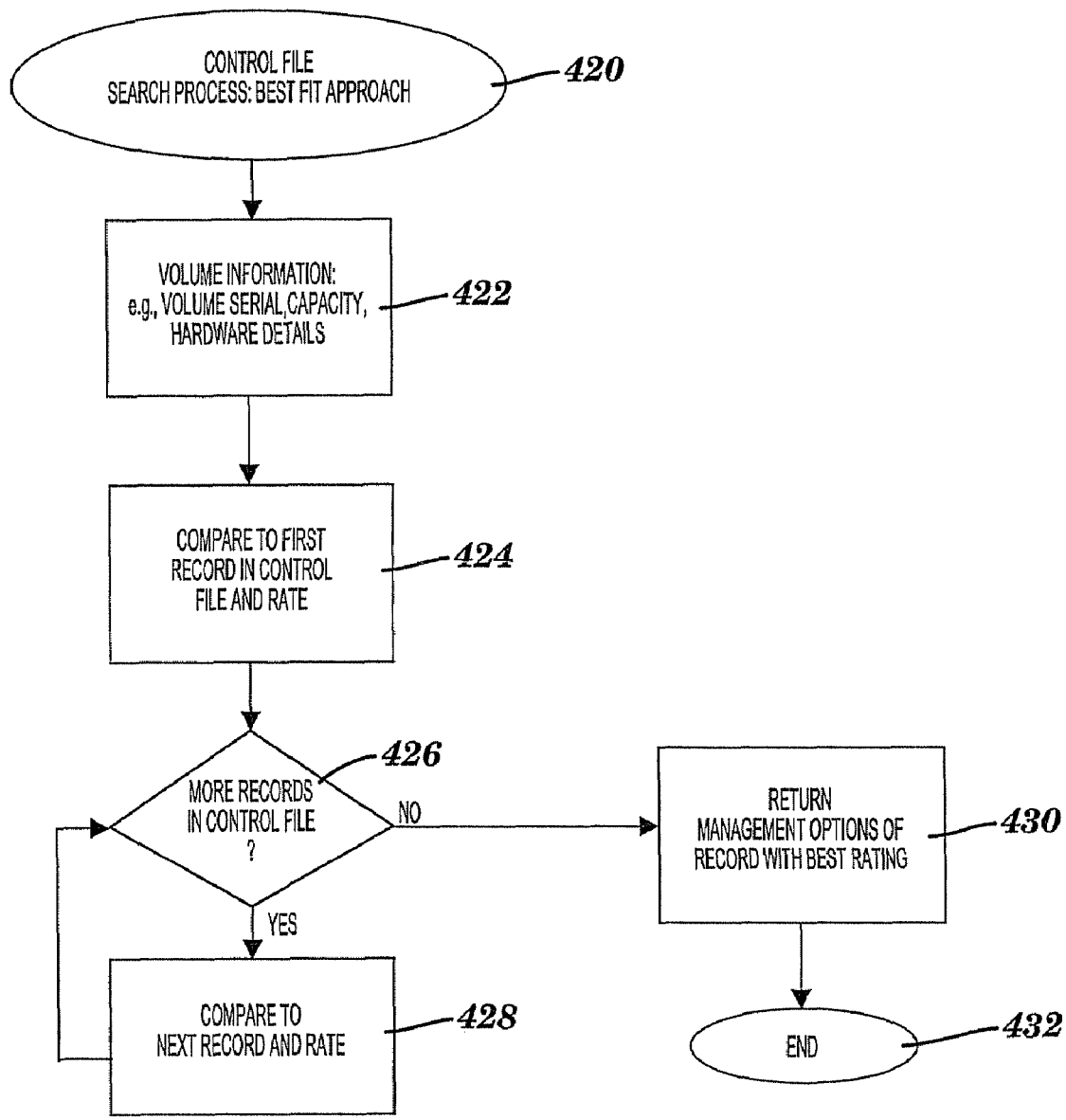
FIG. 4B is a flow chart of a process for retrieving volume management options for the process of FIG. 3 by searching a control file by a best fit approach, in accordance with embodiments of the present invention.

FIG. 4B is a flow chart of a process for retrieving volume management options for the process of FIG. 3 by searching a control file by a best fit approach, in accordance with embodiments of the present invention. The best fit approach of FIG. 4B begins at step 420, and is one example of a retrieval technique utilized by step 304 (see FIG. 3). Step 422 obtains volume information that is associated with the current volume of the loop starting at step 304 (see FIG. 3). Again, the volume information is obtained by the data collection tool utilized in step 302 of FIG. 3, and includes, for instance, the volume's serial number, capacity, and hardware details.

In step 424, the volume information is compared to the first record in control file 216 (see FIG. 2). Similar to the comparison in steps 404 and 408 of FIG. 4A, step 424 compares, for example, the volume serial number to an identification pattern (i.e., a specific identifier or a generic pattern or mask) of a plurality of identification patterns included in control file 216 (see FIG. 2), in which each identification pattern is associated with a specific set of volume management options. The particular patterns and their associated volume management options are determined, for instance, by considering the type of hardware on which the volume exists.

Step 424 also determines a rating for the fit of the first record to the volume information. As one example of a rating technique, a six-character volume serial number included in the volume information is compared in character-by-character order to six-character generic patterns in the control file in which a "%" symbol is a catchall symbol that represents any character. In this example, two types of matches are possible: an exact match (e.g., "A" in the volume serial number compared to "A" in the generic pattern) and a generic match (e.g., "C" in the volume serial number compared to a "%" symbol in the generic pattern). The total rating is determined by one point value being assigned to each exact match and another point value being assigned to each generic match. For this example, the total rating is determined by scoring two points for each exact match, one point for each generic match, and zero points are scored for a mismatch. For instance, a volume serial of ABC123 compared to AD%%%3 would be compared character-by-character, in left to right order, for a score of 2+0+1+1+1+2, or a total score of 7. That is, A compared to A is an exact match and is assigned a score of 2; B compared to D is a mismatch that is assigned a score of 0; C compared to % is a generic match that is assigned a score of 1; 1 compared to % scores 1 for a generic match; 2 compared to % scores 1 for a generic match; and 3 compared to 3 scores 2 for an exact match.

As another example of a rating technique that can be utilized in step 424, a weighting system can be used for pre-defined character positions. For instance, the scoring system of the previous example is used, but the scores for the first three characters are weighted by a factor of two. For a comparison of the ABC123 serial number to the AD%%%3 pattern in the control file, this weighted technique yields a score of 2×2+0×2+1×2+1+1+2, or 4+0+2+1+1+2, or a total score of 10.

Step 426 determines if additional records are included in control file 216 (see FIG. 2) which have not yet been compared to the volume information. If step 426 determines that additional records are included in the control file, then step 428 compares the volume information to the next record of the control file and a rating for the fit of the next record to the volume information is determined. The comparison and rating determination of step 428 uses the same comparison and rating techniques used in step 424. Following step 428, the process loops back to step 426. As the process repeats through this loop, a plurality of ratings is determined. The ratings determined by steps 424 and 428 are examined to determine which rating meets a predetermined criteria (e.g., the highest score) that labels the rating as the best rating. The best rating indicates the best fit between the volume information and a record of the control file. If step 426 determines that no additional records exist in the control file, then the management options included in the control file record for which the best rating was determined is returned in step 430 to the process of FIG. 3, and the search process of FIG. 4B ends at step 432.

In the event that the best rating is associated with a plurality of records of the control file, step 430 consistently selects one record of the plurality of records according to a predetermined selection criteria (e.g., selects the record that is listed in the control file last among the plurality of records that have the highest rating).

Figure 5:
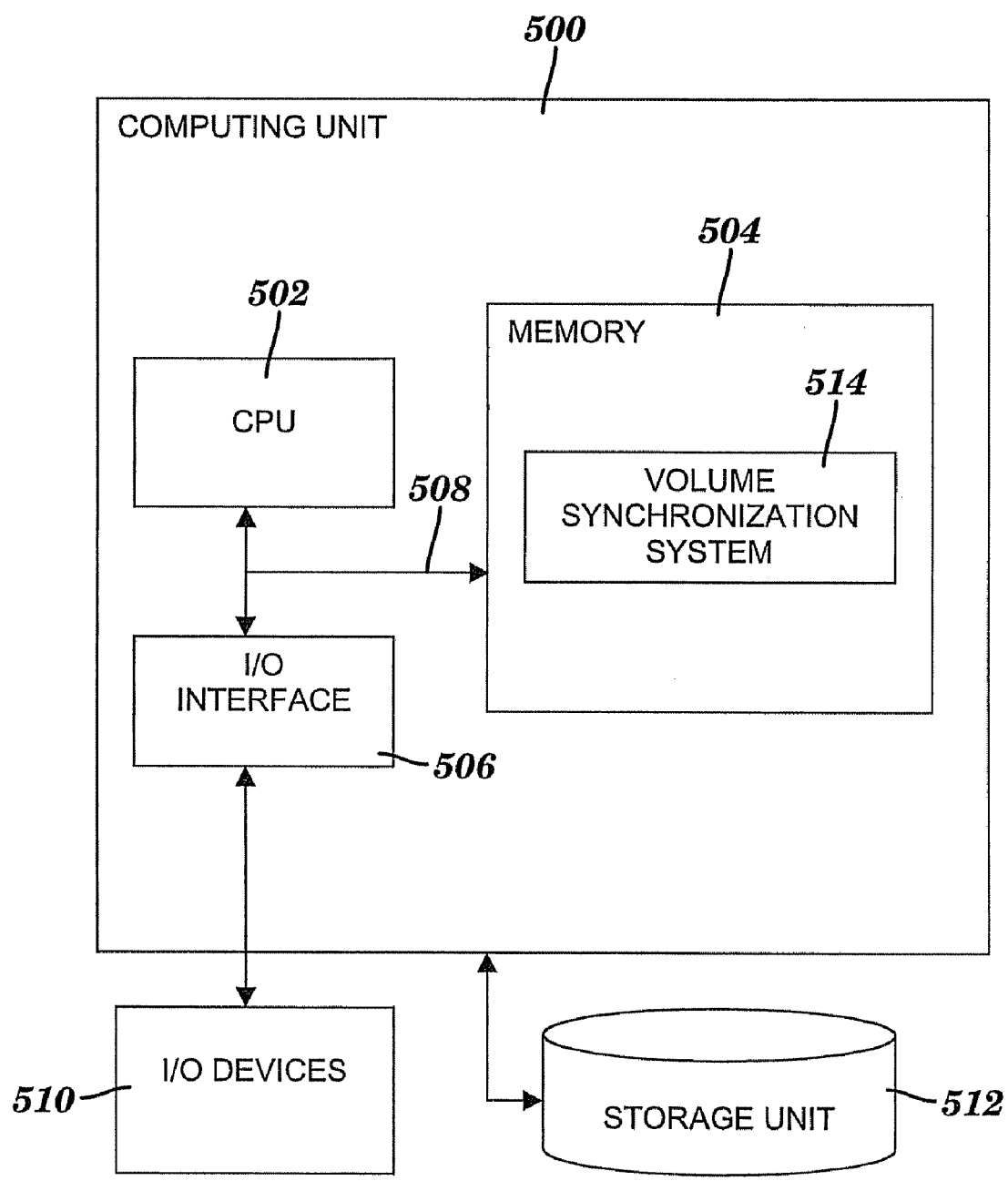
FIG. 5 is a block diagram of a computing system included in the system of FIG. 2, in accordance with embodiments of the present invention.

FIG. 5 is a block diagram of a computing system included in the system of FIG. 1, in accordance with embodiments of the present invention. Server computing unit 500 may be implemented as computing 202 (see FIG. 2). Server computing unit 500 generally comprises a central processing unit (CPU) 502, a memory 504, an input/output (I/O) interface 506, a bus 508, I/O devices 510 and a storage unit 512. CPU 502 performs computation and control functions of computing unit 500. CPU 502 may comprise a single processing unit, or be distributed across one or more processing units in one or more locations (e.g., on a client and server). Memory 504 may comprise any known type of data storage media, including magnetic media, optical media, random access memory (RAM), read-only memory (ROM), a data cache, a data object, etc. Storage unit 512 is, for example, a magnetic disk drive or an optical disk drive. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including a display monitor, keyboard, mouse, printer, speakers, hand-held device, printer, facsimile, etc. Bus 508 provides a communication link between each of the components in computing unit 500, and may comprise any type of transmission link, including electrical, optical, wireless, etc.

I/O interface 506 also allows computing unit 500 to store and retrieve information (e.g., program instructions or data) from an auxiliary storage device, such as a non-volatile storage device (e.g., a CD-ROM drive which receives a CD-ROM disk) (not shown). Computing unit 500 can store and retrieve information from other auxiliary storage devices (not shown), which can include a direct assess storage device (DASD) (e.g., hard disk or floppy diskette), a magneto-optical disk drive or a type drive.

Memory 504 includes computer program code comprising a volume synchronization system 514 that synchronizes direct access storage volumes managed by storage management software (e.g., HSM 214 of FIG. 2) with direct access storage volumes available to a computer system (e.g., system 202 of FIG. 2). Further, memory 504 may include other systems not shown in FIG. 5, such as an operating system (e.g., Linux) that runs on CPU 502 and provides control of various components within and/or connected to computing unit 500.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code 514 for use by or in connection with a computing unit 500 or any instruction execution system to provide and facilitate the capabilities of the present invention. For the purposes of this description, a computer-usable or computer-readable storage medium can be any apparatus than can contain or store the program for use by or in connection with the instruction execution system, apparatus or device.

The medium can be an electronic, magnetic, optical, electromagnetic, or semiconductor system (or apparatus or device). Examples of a computer readable storage medium include a semiconductor or solid state memory, magnetic tape, a removable computer diskette, RAM 504, ROM, a rigid magnetic disk and an optical disk. Current examples of optical disks include compact disk-read-only memory (CD-ROM), compact disk-read/write (CD-R/W) and DVD.

A computing unit 500 suitable for storing and/or executing program code 514 include at least one processor 502 coupled directly or indirectly to memory elements 504 through a system bus 508. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 200 (see FIG. 2), wherein the code in combination with computer system 200 (see FIG. 2) is capable of synchronizing direct access storage volumes managed by storage management software with direct access storage volumes available to a computer system. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

CODE EXAMPLE

The following REXX code is one example of an implementation of portions of the synchronization process of FIG. 3. Comments are included in between the /* and */ indicators. A line that includes /* . . . */ indicates that one or more lines of code are not being shown to allow the code example to focus on the major steps of FIG. 3, and to avoid repetitiveness.

```
/*                        REXX                                            */
/*                     Version 1.3.1                                      */
/*                                                                        */
/*    Dynamically adds, updates, and removes volumes in management        */
/* software to synchronize the set of volumes known to management         */
/* software to the set of volumes available to the computing system.      */
/*                                                                        */
/*    Uses a DCollect as a source of all volumes                          */
/*                                                                        */
/*Constants                                                               */
                                    /* All dcol position include the      */
                                    /* extra print character              */
C.DCOL_TYPE = 5         /*    - Record type                               */
                        /*    'V' type                                    */
C.DCOL_V_VOLSER = 25    /*    - Volser                                    */
C.DCOL_V_UNIT = 69      /*    - Device type i.e., 3390                    */
C.DCOL_V_SG = 83        /*    - Storage group                             */
/*Global variables                                                        */
G.volparm.0 = 0                     /* Reference to volume masks          */
G.sysplex_name = ZLRXVAR(SYSPLXNM)
G.sysplex_csid.0 = 0
G.RetCode = 0
G.update = NO
G.userID = 'DASDADM'
G.vols.0 = 0                        /* List of volumes added to HSM       */
/*The Code                                                                */
PARSE UPPER ARG G.update
/* Find the systems in the sysplex (must be hard coded)                   */
/* Store it in G.sysplex_csid. stem.                                      */
/*. . .*/
SAY "* SYSTEM INFO"
SAY "* System CSID:" G.sysplex_csid.1
IF G.sysplex_csid.0 = 1 THEN SAY "* Monoplex name: "G.sysplex_name
ELSE                         SAY "* Sysplex name: "G.sysplex_name
/*. . .*/
CALL OpenVolumeParmTable /* Reads the management options from the         */
                         /* control file for use later.                   */
                         /* See Step 304 of FIG. 3.                       */
CALL AddVolumes
CALL DeleteVolumes
EXIT 0
/* Creates the CLI command to add/update any volume that matches the      */
/* line. The command is prepared so it can be used later, though it       */
/* may never be referenced.                                               */
/* 'dat' is the record from the config file that matches the volume.      */
/* 'line' is the line number of the records (for error reporting)         */
/*                                                                        */
BuildLine: PROCEDURE
```

-continued

```
    ARG dat, line
    SELECT
/*...*/
        WHEN SUBSTR(dat,12,1) = 'M' THEN /* Migration volume */
            DO
                str="MIGRATION("
                IF SUBSTR(dat,14,1) = 'Y' THEN   /* Autodump it */
                    str=str ||"AD("STRIP(SUBSTR(dat,34,47))") "
                ELSE str=str ||"NOAD "
                IF SUBSTR(dat,16,1) = 'Y' THEN   /* Drain it */
                    str=str ||"DRAIN "
                ELSE str=str ||"NODRAIN "
/*...*/
                val=SUBSTR(dat,28,2)
                IF val=" " THEN str=str||")"
                ELSE         str=str||") THRESHOLD("val")"
            END
        WHEN SUBSTR(dat,12,1) = 'P' THEN /* Primary volume */
            DO
                str="PRIMARY("
                IF SUBSTR(dat,14,1) = 'Y' THEN   /* Autodump */
                    str=str ||"AD("STRIP(SUBSTR(dat,34,47))") "
                ELSE str=str ||"NOAD "
                IF SUBSTR(dat,16,1) = 'Y' THEN   /* Autobackup */
                    str=str||"AB "
                ELSE str=str||"NOAB "
/*...*/
            END
        OTHERWISE
            DO
                SAY "*************************************************"
                SAY "* Illegal "Volume Type" character encountered on line "line
                SAY "*       of DD(VOLTABLE)"
                SAY "* Character found is ' "SUBSTR(dat,12,1)" ' "
                SAY "* Processing terminated"
                SAY "*"
                SAY "* Return code = 8"
                EXIT 8
            END
    END
RETURN str
/*                                                                    */
/* AddVolumes: Automatically adds to management software volumes       */
/* which are available to the system. Automatically updates            */
/* management options in management software.                          */
/* Implements steps 308 & 314 of FIG. 3.                               */
/*                                                                    */
AddVolumes: PROCEDURE EXPOSE G. C.
    "EXECIO * DISKR DCOL(STEM dcol. FINIS)"
    DO c = 1 to dcol.0
        IF SUBSTR(dcol.c,C.DCOL_TYPE,1) = "V" THEN
            IF SUBSTR(dcol.c,C.DCOL_V_SG,1) = " " THEN
                DO
                    vol = SUBSTR(dcol.c,C.DCOL_V_VOLSER,6)
                    unit = SUBSTR(dcol.c,C.DCOL_V_UNIT,4)
                    ent = FindMask(vol)
                    IF ent > 0 THEN
                        DO
                            cmd = "HSEND WAIT ADDVOL "vol" UNIT("unit") "
                            cmd = cmd||SUBSTR(G.volparm.ent,8,LENGTH(G.volparm.ent)-7)
                                        /* attaches the CLI created in BuildLine */
                            IF G.update = UPDATEHSM THEN
                                DO
                                    ADDRESS TSO cmd
                                    IF RC = 0 THEN SAY vol" added to HSM."
                                    ELSE          SAY "hsend command failed!"
                                END
                            ELSE SAY cmd
                            d=G.vols.0+1    /* Store the volume that was just added to be    */
                            G.vols.d=vol    /* used later to determine what volumes should   */
                            G.vols.0=d                  /* be deleted by DeleteVolumes       */
                        END
                END
    END
RETURN
/*                                                                    */
/* FindMask:                                                           */
/*   Using the first fit approach, finds the first mask that matches   */
/*   the volser and returns the array index.                           */
```

-continued

```
/*  Implements Step 304 of FIG. 3.                                          */
/*                                                                          */
FindMask: PROCEDURE EXPOSE G.
    ARG vol
    DO v = 1 to G.volparm.0
        DO c = 1 to 6
            char = SUBSTR(G.volparm.v,c,1)
            IF char ¬= '.' THEN
                IF SUBSTR(vol,c,1) ¬= char THEN c = 8
        END
        IF c < 8 THEN
            DO
                SELECT
/*...*/
                    WHEN SUBSTR(G.volparm.v,7,1) = "-" THEN
                        DO
                            SAY vol" ignored."
                            RETURN 0
                        END
                    WHEN SUBSTR(G.volparm.v,7,1) ¬= "Y" THEN
                                SAY "NON-GSD volume ("vol") found!"
                    WHEN LENGTH(G.volparm.v) = 7 THEN
                        DO
                            SAY vol" ignored. Backup/Dump volumes not supported"
                            RETURN 0
                        END
                    OTHERWISE NOP
                END
                RETURN v
            END
    END
RETURN 0
/*                                                                          */
/* DeleteVolumes: Automatically removes volumes from management             */
/* software. The removed volumes are volumes that are no longer             */
/* available to the system. Implements Step 322 of FIG. 3.                  */
/*                                                                          */
DeleteVolumes: PROCEDURE EXPOSE G. C.
    /* Cleanup primary volumes */
    dsname=G.userID".HSMADVOL.PVOL"
    address tso "del '"dsname"'"
    address tso "hsend wait list pvol ods('"dsname"')"
    "alloc dd(pvol) da('"dsname"') shr"
    "execio * diskr pvol(stem pvol. finis) "
    DO c = 1 to pvol.0
        vol = SUBSTR(pvol.c,2,6)
        SELECT
/*...*/
            WHEN SUBSTR(pvol.c,18,5)="P SMS" THEN NOP  /* Ignore SMS volume */
            OTHERWISE              /* First step, make sure volume is not one of */
                DO                              /* the volumes just added by AddVolumes */
                    IF JustAdded(vol) = "NO" THEN
                        DO              /* Volume was not just added by AddVolumes */
                            cmd = "HSEND DELVOL "vol" PRIMARY"
                            IF G.update = UPDATEHSM THEN
                                DO
                                    ADDRESS TSO cmd
                                    IF RC = 0 THEN SAY vol" deleted from HSM."
                                    ELSE        SAY "hsend command failed!"
                                END
                            ELSE SAY cmd
                        END
                END
        END
    END
    /* Cleanup Migration Level 1 (ML1) volumes */
    dsname=G.userID".HSMADVOL.MVOL"
    ADDRESS TSO "DEL ' "dsname" '"
    ADDRESS TSO "HSEND WAIT LIST MVOL ML1 ODS(' "G.userID".HSMADVOL.MVOL')"
    "ALLOC DD(MVOL) DA(' "dsname" ') SHR"
    "EXECIO * DISKR MVOL(STEM mvol. FINIS) "
    DO c = 1 to mvol.0
        vol = SUBSTR(mvol.c,2,6)
        SELECT
            WHEN vol = "- DFSM"   THEN NOP
            WHEN vol = " "        THEN NOP
            WHEN vol = "VOLSER"   THEN NOP
            WHEN vol = " ----- "  THEN NOP
            OTHERWISE          /* First step, make sure volume is not one of */
```

-continued

```
            DO              /* the volumes just added by AddVolumes */
                IF JustAdded(vol) = "NO" THEN
                    DO          /* Volume was not just added by AddVolumes */
                        cmd = "HSEND DELVOL "vol" MIGRATION(PURGE)"
                        IF G.update = UPDATEHSM THEN
                            DO
                                ADDRESS TSO cmd
                                IF RC = 0 THEN SAY vol" deleted from HSM."
                                ELSE         SAY "hsend command failed!"
                            END
                        ELSE SAY cmd
                    END
            END
        END
    END
RETURN
Just Added: PROCEDURE EXPOSE G.
    ARG vol
    DO c = 1 to G.vols.0
        IF vol = G.vols.c THEN RETURN YES
    END
RETURN NO
```

What is claimed is:

1. A system for synchronizing direct access storage volumes managed by storage management software with direct access storage volumes available to a computer system, comprising:

means for identifying a first set of one or more direct access storage volumes, said first set physically connected to and available to said computer system, said identifying providing an identifier of a direct access storage volume of said first set;

means for matching said identifier with an identification pattern included in a record of one or more records residing in a database accessible by said computer system, said identification pattern identifying said direct access storage volume directly or a group of direct access storage volumes including said direct access storage volume;

means for retrieving from said record, responsive to said matching, a plurality of management options capable of facilitating a management of said direct access storage volume by said storage management software, wherein said direct access storage volume is not designated as being managed by said storage management software; and means for automatically adding said direct access storage volume to a second set of one or more direct access storage volumes, said second set designated as being managed by said storage management software, wherein said means for adding comprises:

means for designating said direct access storage volume as being managed by said storage management software, and means for providing said plurality of management options to said storage management software, wherein said storage management software associates said plurality of management options with said direct access storage volume.

2. The system of claim 1, further comprising:

means for obtaining a second identifier of a second direct access storage volume of said first set, wherein said second direct access storage volume is managed by said storage management software;

means for matching said second identifier with a second identification pattern included in a second record of said one or more records, said second identification pattern identifying said second direct access storage volume directly or a second group of direct access storage volumes including said direct access storage volume;

means for retrieving from said second record, responsive to said matching said second identifier, a first set of management options capable of facilitating management of said second direct access storage volume by said storage management software;

means for retrieving from said storage management software a second set of management options associated with said second direct access storage volume by said storage management software, wherein said second set is different from said first set; and means for automatically updating said second set of management options to be identical to said first set of management options.

3. The system of claim 2, further comprising:

means for repeating said adding for each direct access storage volume of said first set not designated as being managed by said storage management software until said one or more direct access storage volumes of said first set are designated as being managed by said storage management software;

means for determining a second direct access storage volume of said second set is not in said first set; and means for automatically removing, responsive to said determining said second direct access storage volume, said second direct access storage volume from said second set, wherein said removing comprises designating said second direct access storage volume as not being managed by said storage management software.

4. The system of claim 1, wherein said plurality of management options defines at least one of:

an automatic migration of data residing on said direct access storage volume to a migration volume of a specified category, wherein said migration occurs in response to a occupancy rate of said direct access storage volume being at least a first specified threshold rate, said data being at least a first specified age, or a first specified time elapsing since a reference of said data, an expiration of said data, wherein said expiration occurs in response to said occupancy rate being at least a second specified threshold rate, said data being at least a second specified age, or a second specified time elapsing since a reference of said data an automatic backup of said data to a specified category of a backup device, wherein said backup occurs in response to said data being at least a third specified age, or a third specified time elapsing since a reference of said data, an automatic volume dump of allocated space on said direct access storage volume to a specified dump volume based on a specified frequency, and an automatic recall of said data from a migration volume to said direct access storage volume.

5. The system of claim 1, wherein said means for identifying utilizes a software facility to collect one or more unique volume serial numbers associated with said one or more direct access storage volumes of said first set in a one-to-one correspondence, wherein a volume serial number of said one or more volume serial numbers is said identifier.

6. The system of claim 1, wherein said storage management software is Data Facility System Managed Storage Hierarchical Storage Manager (DFSMShsm).

7. A computer program product comprising a computer-usable storage medium including computer-usable program code stored on computer readable storage medium for synchronizing direct access storage volumes managed by storage management software with direct access storage volumes available to a computer system, the said computer program product stored on computer readable storage medium, including:

computer-usable code for identifying a first set of one or more direct access storage volumes, said first set physically connected to and available to said computer system, said identifying providing an identifier of a direct access storage volume of said first set;

computer-usable code for matching said identifier with an identification pattern included in a record of one or more records residing in a database accessible by said computer system, said identification pattern identifying said direct access storage volume directly or a group of direct access storage volumes including said direct access storage volume;

computer-usable code for retrieving from said record, responsive to said matching, a plurality of management options capable of facilitating a management of said direct access storage volume by said storage management software, wherein said direct access storage volume is not designated as being managed by said storage management software; and computer-usable code for automatically adding said direct access storage volume to a second set of one or more direct access storage volumes, said second set designated as being managed by said storage management software, wherein said computer-usable code for adding comprises:
computer-usable code for designating said direct access storage volume as being managed by said storage management software, and
computer-usable code for providing said plurality of management options to said storage management software, wherein said storage management software associates said plurality of management options with said direct access storage volume.

8. The program product of claim 7, further comprising:
computer-usable code for obtaining a second identifier of a second direct access storage volume of said first set, wherein said second direct access storage volume is managed by said storage management software;

computer-usable code for matching said second identifier with a second identification pattern included in a second record of said one or more records, said second identification pattern identifying said second direct access storage volume directly or a second group of direct access storage volumes including said direct access storage volume;

computer-usable code for retrieving from said second record, responsive to said matching said second identifier, a first set of management options capable of facilitating management of said second direct access storage volume by said storage management software;

computer-usable code for retrieving from said storage management software a second set of management options associated with said second direct access storage volume by said storage management software, wherein said second set is different from said first set; and computer-usable code for automatically updating said second set of management options to be identical to said first set of management options.

9. The program product of claim 8, further comprising:
computer-usable code for repeating said adding for each direct access storage volume of said first set not designated as being managed by said storage management software until said one or more direct access storage volumes of said first set are designated as being managed by said storage management software;

computer-usable code for determining a second direct access storage volume of said second set is not in said first set; and computer-usable code for automatically removing, responsive to said determining said second direct access storage volume, said second direct access storage volume from said second set, wherein said removing comprises designating said second direct access storage volume as not being managed by said storage management software.

10. The program product of claim 7, wherein said plurality of management options defines at least one of:

an automatic migration of data residing on said direct access storage volume to a migration volume of a specified category, wherein said migration occurs in response to a occupancy rate of said direct access storage volume being at least a first specified threshold rate, said data being at least a first specified age, or a first specified time elapsing since a reference of said data, an expiration of said data, wherein said expiration occurs in response to said occupancy rate being at least a second specified threshold rate, said data being at least a second specified age, or a second specified time elapsing since a reference of said data an automatic backup of said data to a specified category of a backup device, wherein said backup occurs in response to said data being at least a third specified age, or a third specified time elapsing since a reference of said data, an automatic volume dump of allocated space on said direct access storage volume to a specified dump volume based on a specified frequency, and an automatic recall of said data from a migration volume to said direct access storage volume.

* * * * *